Oct. 22, 1946.  E. MONORI ET AL  2,409,885
GROUND DETECTOR
Filed Oct. 25, 1944
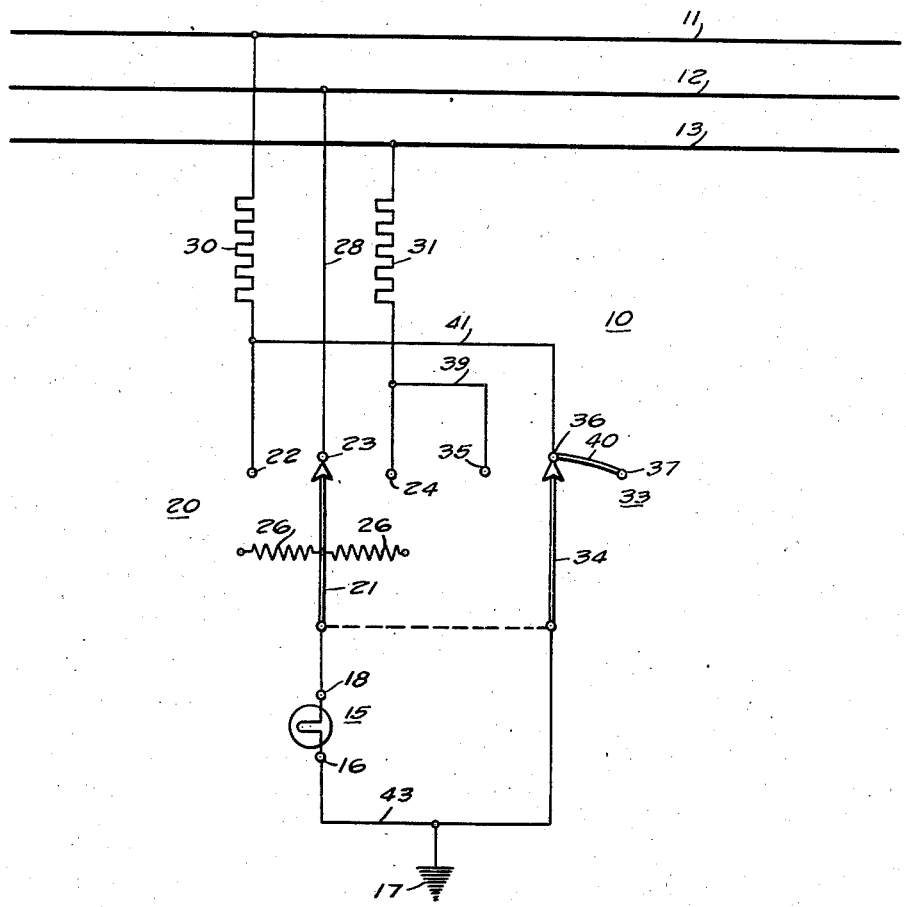
WITNESSES:
E. A. M'Closkey.
G. V. Giolma
INVENTORS
Emil Monori and
Conrad B. Myhre.
BY
[signature] Crawford
ATTORNEY Patented Oct. 22, 1946

2,409,885

UNITED STATES PATENT OFFICE 2,409,885

GROUND DETECTOR

Emil Monori and Conrad B. Myhre, Wilkinsburg, Pa., assignors to Westinghouse Electric Corporation, East Pittsburgh, Pa., a corporation of Pennsylvania Application October 25, 1944, Serial No. 560,335

6 Claims. (Cl. 177—311)

Our invention relates, generally, to indicating systems and has reference in particular to ground detecting and indicating systems for 3-wire electrical systems.

Generally stated, it is an object of our invention to provide a ground detector system for electrical systems that is simple and inexpensive to manufacture and is easy to operate.

More specifically, it is an object of our invention to provide for using a single indicating lamp with switch means for detecting and indicating grounds on a 3-wire system.

It is an important object of our invention to provide for using a single lamp with switch means for indicating generally whether or not the neutral or one of the other conductors of a 3-wire system is grounded and for then selectively determining which of the other conductors is grounded.

Another object of our invention is to provide a simple and effective ground detecting system, using a single indicating lamp which is dark to indicate a ground on any one of the conductors.

Yet another object of our invention is to provide a ground indicating system having a uniform signal for indicating a ground on any one of the conductors of a 3-wire system.

Still another object of our invention is to provide a ground indicating and detection system which requires only a single lamp to maintain supervision of all the conductors of a 3-wire system.

Other objects will, in part, be obvious and will, in part, be explained hereinafter.

In practicing our invention a three-position switch is used for normally connecting one terminal of an indicating lamp to the neutral conductor of a 3-wire system. Resistors are connected to the positive and negative conductors, and the switch is arranged for selectively connecting the lamp terminal to either of these conductors through the resistors. The other terminal of the lamp is grounded and is also connected by an auxiliary switch operatively connected with the aforesaid switch to the positive conductor through its associated resistor when the switch is in the normal position. When the main switch is operated to connect the one terminal of the lamp to either the positive or negative conductor, the auxiliary switch connects the grounded terminal to the conductor of opposite polarity.

For a more complete understanding of the nature and objects of our invention, reference may be made to the following detailed description which may be studied in connection with the accompanying drawing in which the single figure is a diagrammatic view of a ground detection and indicating system embodying the invention in one of its forms.

Referring to the drawing, the reference numeral 10 may denote generally a ground detection system for a 3-wire system comprising positive, neutral and negative conductors 11, 12 and 13, respectively. In order to provide for detecting and indicating a ground on any one of the three conductors, indicating and detecting means, such as the lamp 15, may be provided. One terminal 16 of the lamp may be connected to ground 17 while the other terminal 18 may be arranged for connection to different ones of the conductors by means of a switch 20.

The switch 20 may comprise a movable switch arm 21 which may be connected to the terminal 18 of the indicating lamp and disposed to engage a plurality of stationary contact members 22, 23 and 24. Means, such as the springs 26, may be provided for normally biasing the switch arm 21 to an intermediate position in engagement with the stationary contact member 23. The contact member 23 may be directly connected to the neutral conductor 12 by means of a conductor 28 while the stationary contact members 22 and 24 may be connected to the positive and negative conductors 11 and 13 through current limiting control resistors 30 and 31, respectively.

In order to provide for not only indicating whether the neutral conductor or one or the other of the positive and negative conductors is grounded, but to provide in addition a uniform signal to indicate which of the conductors is grounded, means, such as the auxiliary switch 33, may be provided. The switch 33 may comprise a movable switch arm 34 which may be operatively connected to the switch arm 21 of the main switch 20 so as to move therewith. Stationary contact members 35, 36 and 37 may be provided for engagement with a switch arm 34 in its different operating positions. The contact point 35 may be connected to the contact member 24 of the main switch by means of a conductor 39 while the contact members 36 and 37 may be connected together by means of a conductor 40 and connected to the stationary contact member 22 of the main switch by means of a conductor 41.

With the main and auxiliary switches in the normal operating positions, as shown, and no grounds, the lamp 15 is connected between the neutral conductor 12 and the positive conductor 11 by means of a circuit extending through the conductor 28, switch arm 21, lamp 15, conductor 43, switch arm 34, conductor 41 and resistor 30 to the positive conductor 11. Accordingly, since the lamp and resistor 30 are connected in series circuit relation between the neutral and positive conductors, the lamp burns dimly, indicating a normal operating condition.

Should a ground occur on the neutral conductor 12, the lamp will obviously become dark, since both terminals thereof are connected to ground, and the lamp is, therefore, effectively shunted. A dark condition of the lamp 15 with the switch 20 in the normal operating position is a definite indication of a ground on a neutral conductor.

Should a ground occur on either the positive or the negative conductor, the lamp 15 will burn brightly, since one or the other of the control resistors 30 or 31 will be effectively shunted by means of such grounds. Thus, the lamp 15 is effectively connected directly between the neutral conductor 12 and the positive conductor 11 or the negative conductor 13, depending on which of these is grounded. To determine whether the positive conductor or negative conductor is grounded, the main switch 21 may be operated to engage one or the other of the contact members 22 or 24. If the lamp becomes dark when the arm 21 engages the contact member 22, this indicates that the ground is on the positive conductor 11, since such a ground together with the ground connection 17 effectively shunts the lamp 15 with the switch 20 in the left-hand position.

Should the lamp 15 instead burn brightly when the switch arm 21 engages the contact member 22, this indicates that the positive conductor is not grounded. Accordingly, the switch 20 may be operated to the right-hand position so that the switch arm 21 engages the contact member 24, whereupon the lamp 15 becomes dark, indicating that the negative conductor 13 is grounded. Should the lamp 15 be dark for all operating positions of the switch 20, this indicates that the lamp is burned out.

From the above description and accompanying drawing, it will be apparent that we have provided in a simple and effective manner for indicating and detecting grounds on 3-wire electrical systems whether direct current or alternating current. Only a single indicating lamp is necessary and in each instance the same signal—a dark lamp—is used to indicate a grounded condition on a particular conductor. The amount of equipment involved is a minimum, and continuous supervision of all three conductors is provided at all times.

Since certain changes may be made in the above described construction, and different embodiments of the invention may be made without departing from the spirit and scope thereof, it is intended that all the matter contained in the above description and shown in the accompanying drawing shall be considered as illustrative and not in a limiting sense.

We claim as our invention:

1. In a ground detector system for a 3-wire electrical system having a neutral conductor, a lamp having one terminal grounded, impedance means connected to each of the other conductors, circuit means including a switch normally connecting the other terminal to the neutral conductor and selectively operable to connect it to the impedance means of either of the other conductors, and circuit means including control means normally connecting the grounded terminal of the lamp to one of the other conductors and connecting one of the impedance means to ground, said control means being operable in accordance with operation of said switch to connect said other terminal to the impedance means of a different one of the other conductors.

2. For use in detecting grounds on a 3-wire electrical system having a pair of conductors of differential potentials with a neutral conductor, a single lamp having a pair of terminals, an impedance device connected to each of the other conductors of different potentials, circuit means connecting one of the lamp terminals to ground, means including a switch normally connecting the other terminal to the neutral conductor and operable to connect it to either of the other conductors through one or another of said impedance devices, and auxiliary switch means normally connecting the grounded terminal to one of the other conductors and operable in response to operation of the switch from the normal position to connect the lamp to said one of the other conductors to connect the grounded terminal to the other of said other conductors.

3. In a ground detector system for a 3-wire electrical system having a neutral conductor with relatively positive and negative conductors, impedance means having one terminal of each connected to the positive and negative conductors, an indicating lamp having one terminal grounded, and means including a switch normally connecting the lamp between the neutral conductor and ground and connecting one of the other conductors to ground through its impedance means, said switch being operable to selectively connect the grounded terminal to one of the other conductors through one of the impedance means and connect the other terminal to the other conductor through the other impedance means.

4. For use in detecting and indicating grounds on a 3-wire electrical system having a neutral conductor with relatively positive and negative conductors, a single lamp, impedance means connected to the positive and negative conductors, and switch means normally connecting the lamp between the neutral conductor and one of the other conductors through its associated impedance means with a ground connection intermediate the lamp and the impedance means, said switch means being operable to connect the lamp intermediate the relatively positive and negative conductors through said impedance means with the ground connection intermediate the lamp and the impedance means of either of the conductors.

5. In a ground detection system for a 3-wire electrical system having a neutral conductor with relatively positive and negative conductors, a lamp having one terminal grounded, a resistor connected to each of the relatively positive and negative conductors, and circuit means including a switch normally connecting the lamp between the neutral conductor and one of the other two conductors through its resistor with the ground connection adjacent the resistor associated with said conductor for determining whether there is a ground on the neutral conductor or one of the other conductors, said switch being operable to connect the lamp between the other two conductors through said resistors with the ground connection adjacent the resistor of one or the other of the conductors for determining which of the other conductors is grounded.

6. For use in detecting and indicating grounds on a 3-wire electrical system having positive and negative conductors with a neutral conductor, an indicating device having one terminal grounded and the other ungrounded, a control resistor connected to each of the positive and negative conductors, main switch means normally connecting the ungrounded terminal of the indicating device to the neutral conductor and selectively operable to connect it to the positive or negative conductor through its associated control resistor, and auxiliary switch means operatively connected to the main switch means normally connecting the grounded terminal to the positive conductor through its control resistor and operable with the main switch means to connect the grounded terminal to the conductor of opposite polarity from that to which the ungrounded terminal is connected.

EMIL MONORI.
CONRAD B. MYHRE.